United States Patent [19]

Keener

[11] Patent Number: 4,911,634

[45] Date of Patent: Mar. 27, 1990

[54] CULINARY APPARATUS

[76] Inventor: Jerry L. Keener, 7891 C.R. 50, Butler, Ind. 46721

[21] Appl. No.: 253,373

[22] Filed: Sep. 30, 1988

Related U.S. Application Data

[63] Continuation of Ser. No. 12,724, Feb. 5, 1981, abandoned.

[51] Int. Cl.[4] .............................................. A21C 11/00
[52] U.S. Cl. ....................................... 425/412; 99/433; 249/149; 249/187.1; 426/280; 426/391
[58] Field of Search .................... 249/100, 101, 187.1, 249/144, 149; 99/353, 426, 432, 433, DIG. 15; 220/254, 353; 138/96 R; 425/398, 406, 412; 426/92, 94, 138, 391, 279, 280, 283

[56] References Cited

U.S. PATENT DOCUMENTS

| | | | |
|---|---|---|---|
| 3,075,358 | 1/1963 | Becker et al. | 138/96 R |
| 3,283,639 | 11/1966 | Holton | 138/96 R |
| 4,367,243 | 1/1983 | Brummett et al. | 99/432 |
| 4,449,912 | 5/1984 | Ogura | 249/100 |
| 4,496,815 | 1/1985 | Jorgensen | 99/DIG. 15 |

FOREIGN PATENT DOCUMENTS

| | | | |
|---|---|---|---|
| 148795 | 11/1952 | Australia | 249/100 |
| 662591 | 6/1938 | Fed. Rep. of Germany | 138/96 R |

Primary Examiner—James C. Housel
Attorney, Agent, or Firm—David A. Lundy

[57] ABSTRACT

A culinary template for use with a pan and a culinary substrate. The culinary template has a collar having a contact portion which defines a first plane. A wall extends down from the collar. The wall has a substrate indenting edge, which defines a second plane. The wall has a length from the first plane to the second plane less than the depth of the pan. The wall has a length from the first plane to the second plane sufficient to indent the culinary substrate upon disposition of the contact portion of the collar on the brim of the pan.

16 Claims, 1 Drawing Sheet

U.S. Patent    Mar. 27, 1990    4,911,634
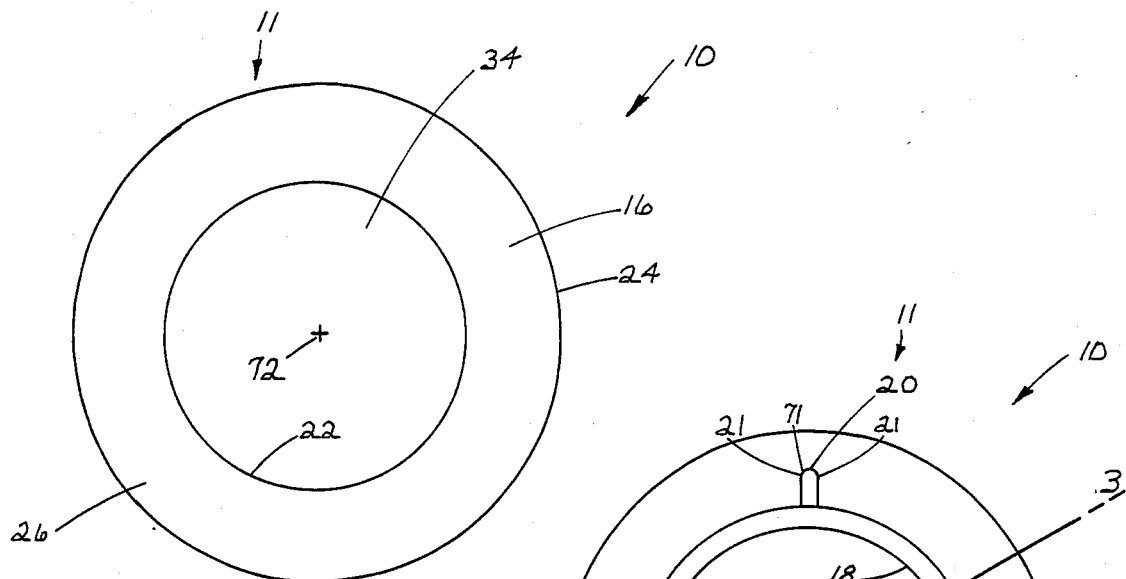
FIG. 1
FIG. 2
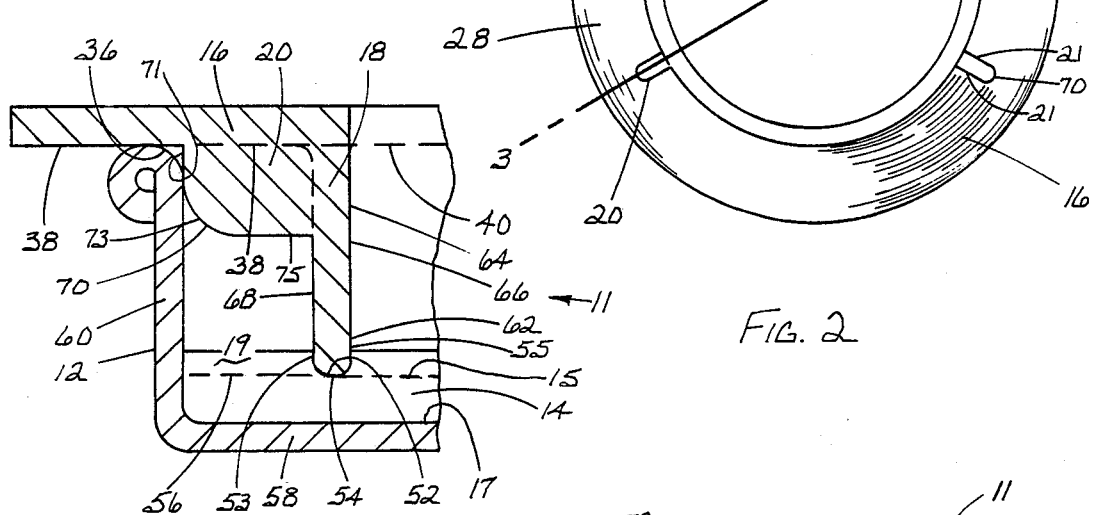
FIG. 4
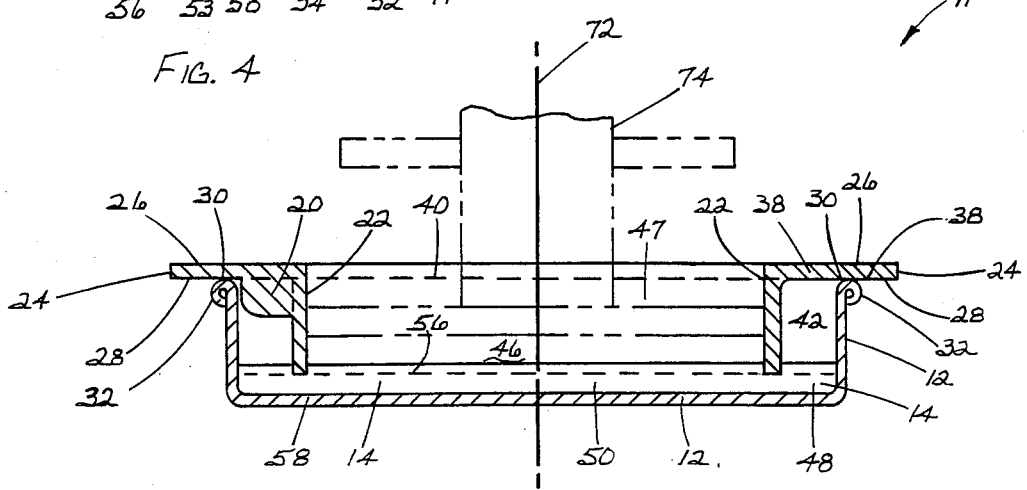
FIG. 3

CULINARY APPARATUS

This is a continuation of co-pending application Ser. No. 012,724 filed on Feb. 5, 1987, now abandoned.

SUMMARY OF THE INVENTION

This invention relates to culinary templates and more particularly culinary apparatus and methods for pizza pans.

As pizza has undergone a transition in this country from a homemade ethnic dish to one of the most commonly eaten foods, the production of pizza in a restaurant setting has gone from the job of a highly skilled chef under little time constraint to the job of unskilled help operating under extreme time constraints.

This has resulted in pizzas being made that have sauce and toppings inaccurately placed on the dough layer. When such pizzas are baked, sauce or toppings overlaying the crust portion of the pizza tend to burn while the crust undergoes a desired browning. This is particularly a problem with pizzas which have a thicker crust and are cooked in a pan. Such pizzas are sometimes referred to as "deep dish" pizzas. A laterally narrow crust is preferred for such thicker pizzas since the surface area of such pizzas is a much smaller portion of their relative volume than is the case with thin pizzas. Narrow margins are relatively harder to form on pizzas than wider margins and it is easier to spill toppings or sauce over and beyond such narrow margins than is the case with wider margins.

It is therefore highly desirable to provide an improved culinary apparatus, and improved culinary method. It is also highly desirable to provide an improved culinary apparatus and improved culinary method which can impress a border between an outer section and an inner section of a culinary substrate such as pizza dough. It is also highly desirable to provide an improved culinary apparatus, and improved culinary method that can isolate an outer section of culinary substrate from an inner section of culinary substrate. It is also highly desirable to provide an improved culinary apparatus and improved culinary method which meets all of the above described features.

It is therefore an object of this invention to provide an improved culinary apparatus and improved culinary method.

It is also an object of this invention to provide an improved culinary apparatus and improved culinary method which can impress a border between an outer section and an inner section of a culinary substrate such as pizza dough.

It is also an object of this invention to provide an improved culinary apparatus and improved culinary method that can isolate an outer section of culinary substrate from an inner section of culinary substrate.

It is finally an object of this invention to provide an improved culinary apparatus and improved culinary method which meets all of the above desired features.

In the broader aspects of this invention there is provided a culinary apparatus and culinary method. The culinary apparatus includes a culinary template, which has a collar having a contact portion which defines a first plane. The culinary template has a wall extending down from the collar. The wall has a substrate indenting edge. The substrate indenting edge defines a second plane. The wall has a length from the first plane to the second plane less than the depth of the pan.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein:

FIG. 1 is a top plan view of an embodiment of a culinary apparatus of the invention.

FIG. 2 is a bottom plan view of the culinary apparatus of FIG. 1.

FIG. 3 is a cross-sectional view taken along Section Line 3—3 of FIG. 2 of another embodiment of the culinary apparatus of the invention, which includes the culinary template of the culinary apparatus of FIGS. 1 and 2.

FIG. 4 is an enlarged partial cross sectional view of the culinary apparatus of FIG. 3 also taken along Section Line 3—3 of FIG. 2.

DESCRIPTION OF SPECIFIC EMBODIMENT

The culinary apparatus 11 of the invention includes a culinary template 10 and may include a pan 12 and also may include a culinary substrate 14.

The culinary template 10 is for use with a pan 12 containing a culinary substrate 14, onto a part of which one or more layers of culinary material are to be added. The term "pan" in this application is used to refer to a conventional deep dish pizza pan; any other one-piece baking pan, whether cylindrical or rectangular or some other shape; any multi-piece pan, having for example, separable bottom and side pieces; any separable piece or pieces of a multi-piece pan, and any other structure having, in part or as a whole, the shape of a pan or a portion of a pan and being capable of use with the culinary template 10. The term "culinary substrate" is used in this application to refer to pizza dough or to any other kind of dough or other substance with which the culinary template of the invention could be used. The term "culinary material" is used in this application to refer to any one or more food products which could be used on or as a culinary substrate, such as, for example, pizza sauce, cheese, sausage, pizza dough or any combination of the above or other ingredients.

The culinary template 10 has a collar 16 and a wall 18 extending down from the collar 16. The overall transverse shape and size of the collar 16 and wall 18 is determined by the shape and size of the pan 12, which may be circular in outline, or rectangular, or another shape as desired. A particular culinary template 10 is thus limited to use on a particular size and shape pan 12. Pizza pans are, however, generally standardized and various preferred culinary templates 10 of the invention are adapted for use on standardized pizza pans 12.

In a preferred embodiment of the invention, the culinary template 10 has one or more positioners 20 extending down from the collar 16. The culinary template 10 is preferably unitary and seamless, and generally smooth to prevent culinary material and the culinary substrate from adhering and is sufficiently rigid to prevent deformation under its own weight or under impacts from kitchen utensils or the like during use.

Collar 16 has an inside margin 22 and an outside margin 24 and an upper surface 26 and a lower surface 28. Inside margin 22 is smaller than the opening defined by the brim 30 of pan 12. Outside margin 24 is larger than the opening defined by the brim 30 of pan 12. The term "brim", as used in this application, refers to the uppermost edge of pan 12 and not necessarily to an upper reinforcement structure, such as rim 32 of pan 12 illustrated in FIG. 3.

Collar 16 surrounds a central opening 34. Upper surface 26 of collar 16 is preferably either sloped toward central opening 34 or flat.

The lower surface 28 of collar 16 has contact portion 36 and flanking portion or portions 38, one of which is an imperforate inner flanking portion 42. The contact portion 36 of lower surface 28 of collar 16 has about the same shape as brim 30 of pan 12. Contact portion 36 defines a first plane 40. When the culinary template 10 is disposed on pan 12, contact portion 36 is in essentially continuous contact with brim 30 of pan 12. First plane 40 is essentially coplanar with the opening defined by brim 30 of pan 12.

In a preferred embodiment of the invention, in addition to inner flanking portion 42, which is disposed between contact portion 36 and wall 18, there is an outer flanking portion 44 disposed between contact portion 36 and outside margin 24. Outer flanking portion 44 is wide enough to provide a convenient site by which culinary template 10 can be manipulated during use. A minimum lateral dimension of outer flanking portion 44 of one-sixteenth to one-eighth inch beyond rim 32 of pan 12 is desirable.

Wall 18 extends down from collar 16 and, in a preferred embodiment, wall 18 adjoins inside margin 22. A central cavity 46 is defined and surrounded by wall 18. Central cavity 46 has smaller transverse dimensions than the traverse dimensions of pan 12. Central opening 34 and central cavity 46 together form central passage 47. When the culinary template 10 is disposed on pan 12, wall 18 also defines peripheral cavity 19 which is exterior to wall 18 and enclosed by wall 18, pan 12, and collar 16.

Wall 18 is generally separated from contact portion 36 of lower surface 28 of collar 16 by a distance about equal to a desired lateral dimension of an outer section 48 of culinary substrate 14, which underlays flanking portion 38 of lower surface 28 when culinary template 10 is disposed on pan 12. An inner section 50 of culinary substrate 14 underlays central cavity 46. Outer section 48 and inner section 50 are divided by impressed border 52.

Wall 18 at its farthest separation from collar 16, has substrate indenting edge 54 which defines a second plane 56. In a preferred embodiment of the invention, first plane 40 is parallel to second plane 56 and wall 18 is perpendicular to each plane 40, 56.

In use, contact portion 36 of collar 16 is separated from the bottom 17 of culinary substrate 14 by a selected first working separation in a direction from plane 40 toward plane 56, and from the top 15 of culinary substrate 14 by a selected second working separation in a direction from plane 40 toward plane 56. The exact dimension of these working separations depends upon the pan 12 being used.

Wall 18 has a length from first plane 40 to second plane 56 less than the first working separation and less than the depth of pan 12 either from the opening defined by the brim 30 of pan 12 to the bottom 58 of pan 12 or alternatively, if pan 12 is open-bottomed, from the opening defined by brim 30 to a work surface on which the pan rests. If pan 12 has a rectangular cross-section, the length of wall 18 from first plane 40 to second plane 56 is less than the length of the sidewall 60 of pan 12 from brim 30 to bottom 58. Central cavity 46 is shallower than pan 12.

Wall 18 has a length greater than the second working separation. The length of wall 18 is sufficient to indent culinary substrate 14 when culinary template 10 is disposed on pan 12, but the length of wall 18 is not sufficient to contact bottom 58 of pan 12 when culinary template 10 is disposed on pan 12. The length of wall 18 is equal to the depth of pan 12 from the opening defined by brim 30 to the bottom 58 less the desired thickness of impressed border 52 of culinary substrate 14 in a direction extending up from bottom 58 of pan 12.

Wall 18 has an indenting section 62 adjoining substrate indenting edge 54 and an imperforate barrier section 64 between indenting section 62 and collar 16. Indenting section 62 has a length in a direction perpendicular to planes 40, 56 sufficient to indent culinary substrate 14 to a desired depth. Indenting section 62 of wall 18 is complimentary in shape to a desired shape of impressed border 52 of culinary substrate 14. A desirable depth for impressed border 52 depends upon the culinary substrate 14 and the culinary material to be added. For example, addition of a relatively large amount of thin tomato sauce over pizza dough might make a deeper impressed border 52 desirable since the deeper impressed border 52 could hold excess sauce. Collar 16 is sufficiently rigid to prevent collar 16 from deforming during use such that substrate indenting edge 54 of wall 18 would deflect against the bottom 58 of pan 12.

In a preferred embodiment of the invention, it is desirable that impressed border 52 have the shape of a trench with substantially parallel trench sides 53, 55 preferably perpendicular or within a few degrees of perpendicular to planes 40, 56 and that trench sides 53, 55 have a depth between about one quarter and about three quarters, or more preferably, about one-third and about two-thirds of the thickness of culinary substrate 14. In that embodiment of the culinary template 10 indenting section 62 of inner and outer surfaces 66, 68 of wall 18 are likewise parallel and perpendicular or within a few degrees of perpendicular to planes 40, 56 and indenting section 62 has the same length as the desired depth of trench sides 53, 55.

With some culinary substrates, it is desirable that substrate indenting edge 54 be sufficiently blunt and thick to avoid cutting the culinary substrate as opposed to deflecting or deforming it when culinary template 10 is placed upon pan 12. Barrier section 64 of wall 18 may adjoin indenting section 62 such that wall 18 is, as a whole, perpendicular or at least roughly perpendicular to collar 16. Alternatively, barrier section 64 may have some other shapes such as a stepped shaped to permit stacking, however in most uses, it is preferred that wall 18 be at least generally perpendicular to collar 16 since other shapes of wall 18 restrict access to inner section 50 of culinary substrate 14, or tend to accumulate excess culinary material on wall 18 during use which may drop onto culinary substrate 14 as culinary template 10 of the invention is removed.

A plurality of positioners 20 extend down from collar 16 and delimit and adjoin contact portion 36 and limit lateral movement of culinary template 10, when culinary template 10 is performed on pan 12 with contact portion 36 touching brim 30. Each positioner 20 is spaced apart from adjacent positioners 20 by a segment of contact portion 36 which defines an angle of less than 180 degrees. The number of positioners 20 and the placement of positioners 20 is sufficient to prevent lateral displacement of culinary template 10 from pan 12, when culinary template 10 is positioned on pan 12 with contact portion 36 touching brim 30. Additional positioners 20 beyond the number necessary to delimit contact portion 36 may be present and some or all positioners 20 may be joined together to form an interrupted or continuous skirt extending down from collar 16.

Positioners 20 may extend down from either inner flanking portion 42 or outer flanking portion 44. Each positioner 20 has a contact margin 70 adjoining contact portion 36 of lower surface 28 of collar 16. In a particular embodiment of the invention, each positioner 20 has a pair of opposed sides 21 adjoining contact margin 70. In a particular embodiment of the invention, contact margin 70 is divided into an upper portion 71, a middle portion 73 and a bottom portion 75. Upper portion 71 adjoins contact margin 70 of collar 16, about midway between inside margin 22 and outside margin 24. In that embodiment, contact margin 70 has a bowed shape and extends down from one flanking portion 38 and away from the other flanking portion 38. Upper portion 71 extends down from collar 16 generally perpendicular to first plane 40. Bottom portion 75 faces downward. Between upper portion 71 and bottom portion 75 is middle portion 73 which is convexly curved. In a particular embodiment of the invention, as illustrated in FIG. 2, upper portion 71 is semi-circular in transverse cross-section. In a preferred embodiment of the invention, contact margins 70 are generally convex and smooth. In that embodiment of the invention, culinary template 10 has a weight sufficient to impede stable placement of culinary template 10 on pan 12 with one or more positioners 20 in contact with brim 30. Positioners 20 thus provide self-centering of culinary template 10 on pan 12, whereby alignment of contact portion 36 and brim 30 is corrected by the action of gravity on culinary template 10.

Positioners 20 each have a length from first plane 40 in the direction of second plane 56 sufficient to perceptibly offset collar 16 from brim 30 of pan 12 when one or more positioners 20 is in contact with brim 30. The offset is a noticeable gap and/or obliquity between at least part of collar 16 and brim 30 which alerts the user to misalignment of culinary template 10 and pan 12.

In a preferred embodiment of the invention, when culinary template 10 and pan 12 are aligned both culinary template 10 and pan 12 are concentric about a common axis 72 and wall 18 and contact portion 36 and positioners 20 are concentric.

In a preferred embodiment of the invention, the length of positioners 20 from first plane 40 in the direction of second plane 56 is insufficient to contact culinary substrate 14 when culinary template 10 is placed on pan 12 with contact portion 36 abutting brim 30.

In a particular embodiment of the invention, as illustrated in the Figures, the length of positioners 20, is less than half the length of wall 18. In a particular embodiment of culinary apparatus 11 of the invention, positioners 20 each have a uniform width in a direction transverse to contact margin 70 and sides 21 are parallel as shown in FIG. 2. That width is less than the length of positioners 20 in a direction perpendicular to first plane 40 and less than the breath of positioners 20 in a direction normal to wall 18.

If desired, positioners may be sized within very close lateral tolerances of pan 12 so that positioners 20 engage or grip pan 12 and prevent accidental disengagement of culinary template 10 and pan 12. In such uses, positioners 20 can limit upward movement of culinary template 10 in relation to pan 12. This is desirable in uses where, for example, some part of inner section 50 of culinary substrate 14 is pressed under wall 18 in order to increase the thickness of outer section 48 of culinary substrate 14. Pressure on inner section 50 may be applied by hand or by means of a removable piston 74 complimentary in shape to wall 18. In such a use, culinary template 10 may have a weight either sufficient by itself or in combination with the frictionally engaged positioners 20 to prevent culinary template 10 from moving in relation to pan 12 during use. Culinary template 10 must, in any case, be sufficiently rigid to not deform as the culinary substrate 14 is squeezed.

A method of the invention is a procedure for producing a layered culinary product. In that method a pan 12 is prepared containing a culinary substrate 14. An impressed border 52 is then indented into the culinary substrate 14 by placing the culinary template 10 on brim 30 of pan 12. The border 52 has a thickness of culinary substrate 14 which is generally equal to the difference between the depth of the pan 12 and the length of wall 18. Outer section 48 of culinary substrate 14 is isolated from central passage 47 by placement of culinary template 10 on brim 30 of pan 12. This isolation is maintained while one or more additional culinary layers are formed by adding culinary material onto inner section 50 of culinary substrate 14. Prior to or during the formation of the additional culinary layers, inner section 50 of culinary substrate 14 may be compressed manually, by use of a utensil, or by use of piston 74. This may be done to reduce the porosity of inner section 50 and/or to squeeze culinary substrate 14 under wall 18. Culinary template 10 is then removed.

In a preferred embodiment of the invention, in which upper surface 26 of collar 16 is substantially planar, a structure having a generally planar edge may be moved across upper surface 26 of collar 16 after culinary material has been added to inner section 50 of culinary substrate 14 to clear any residual culinary material from upper surface 26 prior to removal of culinary template 10 from pan 12. This prevents residual culinary material from dropping onto outer section 48 of culinary substrate 14 during removal of culinary template 10 from pan 12. Alternatively, upper surface 26 may be swept manually prior to removal of culinary template 10 from pan 12.

An alternative method of the invention is placing culinary material in the form of a ball or lump in a pan 12, placing culinary template 10 on pan 12, spreading the culinary material, by use of a piston 74 or manually, to form culinary substrate 14, and then adding additional culinary layers as discussed above. In this embodiment of the invention, means must be provided, as discussed above, to prevent culinary template 10 from being pushed up by culinary material forced under wall 18.

The method of the invention can be applied to the preparation of pizza. For example, in one embodiment of the method of the invention, pizza dough is placed within pan 12 and allowed to rise. Culinary template 10 is then placed on pan 12 indenting the pizza dough and forming impressed border 52. In a specific embodiment of the invention, typical dimensions are about one and seven-eighths to two inch high sidewalls 60 on pan 12, a depth of pizza dough at inner section 50 and outer section 48 of about three-quarters to one inch, a wall 18 length of about one and one-half inches, a border depth of about one-quarter to five-eighths inches, and a thickness of wall 18 and collar 16 of about one-quarter inch. Outer section 48 and inner section 50, defined by impressed border 52, are the crust section and toppings sections of the pizzas to be produced, respectively. Outer section 48, the crust, is protected from pizza sauce and spilled toppings while the sauce and toppings are placed on the pizza dough.

While a specific embodiment of the invention has been shown and described herein for purposes of illustration, any patent which may issue upon this application is not limited strictly to the disclosed embodiment or embodiments, but extends to all structures and methods and arrangements which contain the essence of the invention and which fall fairly within the scope of the claims which are appended hereto.

What is claimed is:

1. A culinary apparatus comprising a culinary template having a collar, a wall and a plurality of positioners, said collar having an inside margin and an outside margin, said collar having a lower surface and an upper surface, said lower surface defining a first plane, said lower surface having a first flanking portion adjacent said inside margin, a second flanking portion adjacent said outside margin, and a contact portion between said flanking portions, said wall extending downwardly from said first flanking portion, said wall and said inside margin together defining a central passage extending through said culinary template, a plurality of spaced positioners extending down from one of said flanking portions, each said positioner having a pair of opposed sides and a contact margin delimited by said sides, said contact margins each adjoining said contact portion of said lower surface, said contact margins each having a bowed shape extending down from said first flanking portion and away from said second flanking portion.

2. The culinary apparatus of claim 1 wherein said contact margins each have an upper portion, a middle portion, and a bottom portion, wherein said upper portions are each generally perpendicular to said first plane, wherein said middle portions are each convex, and wherein said bottom portions each face downward.

3. The culinary apparatus of claim 2 wherein said upper portions each adjoin said collar about midway between said inside margin and said outside margin.

4. The culinary apparatus of claim 2 wherein each said upper portion is semicircular in a cross-section parallel to said first plane.

5. The culinary apparatus of claim 1 wherein each said positioner has a length perpendicular to said first plane, a breadth parallel to said first plane and normal to said wall, and a width between said opposed sides, said length and breadth each being greater than said width.

6. The culinary apparatus of claim 5 wherein said width is substantially uniform adjacent said contact margin.

7. The culinary apparatus of claim 5 wherein said positioner length is less than half the length of said wall perpendicular to said first plane.

8. The culinary apparatus of claim 1 wherein said inside margin and said outside margin are each perpendicular to said first plane.

9. The culinary apparatus of claim 1 further comprising a piston complementary in shape to said wall, said piston being movable in a direction perpendicular to said first plane within said central passage.

10. The culinary apparatus of claim 1 further comprising a pan including a sidewall, said sidewall having a brim, said brim being displacably disposed in substantially continuous contact with said contact portion.

11. The culinary apparatus of claim 10 wherein said pan has a bottom connected to said sidewall opposite to said brim and defining a base plane parallel to said first plane, and wherein the length of said wall perpendicular to said first plane is less than the length of said sidewall perpendicular to said base plane from said brim to said bottom.

12. A culinary apparatus comprising a pan and a culinary template, said pan having a bottom and a sidewall extending up from said bottom, said sidewall having a brim, said culinary template having a collar and a wall and a plurality of spaced positioners, said collar having an inside margin and an outside margin, said collar having an upper surface and a lower surface, said lower surface having an inner flanking portion adjacent said inside margin and an outer flanking portion adjacent said outside margin and a contact portion, said contact portion being between said flanking portions, said contact portion defining a first plane, said contact portion being displacably disposed in at least substantially continuous contact with said brim of said pan, said wall extending downwardly from said inner flanking portion, said wall and said inside margin together defining a central passage extending through said template, said wall having an indenting edge spaced from said collar, said wall having a length from said first plane to said indenting edge less than the length of said sidewall from said bottom to said brim, said positioners extending down from one of said flanking portions, said positioners delimiting said contact portion.

13. The culinary apparatus of claim 12 wherein said positioners each have a length from said first plane toward said indenting edge sufficient to offset said collar from said brim, upon disposition of at least one of said positioners against said brim.

14. The culinary apparatus of claim 12 wherein said positioners each have a contact margin extending downwardly from said collar adjacent said contact portion, curving convexly, and extending to said wall, and wherein said culinary template has a weight sufficient to prevent stable placement of said collar on said pan in a position with at least one of said contact margins disposed against said brim, whereby said positioners correct alignment of said contact portion and said brim by the action of gravity on said culinary template.

15. The culinary apparatus of claim 12 further comprising a piston disposed within said central passage, said piston being movable toward said bottom.

16. A culinary apparatus comprising a pan having a bottom and a sidewall extending up from said bottom, said sidewall having a brim, a culinary template having a collar and a wall, and a plurality of spaced positioners, said collar having an upper surface and a lower surface, said lower surface having a first inner flanking portion and a second outer flanking portion and a contact portion, said contact portion being between said flanking portions, said contact portion defining a first plane, said contact portion being displacably disposed, substantially continuous contact with said brim of said pan, said collar having an inside margin and an outside margin, said wall extending downwardly from said first inner flanking portion, said wall and said inside margin together defining a central passage extending through said culinary template, said wall having an indenting edge spaced from said collar, said indenting edge defining a second plane, said wall having a length from said first plane to said second plane less than the depth of said pan from said bottom to said brim, said positioners extending down from one of said flanking portions, said positioners delimiting said contact portion.

* * * * *